Figure 1:
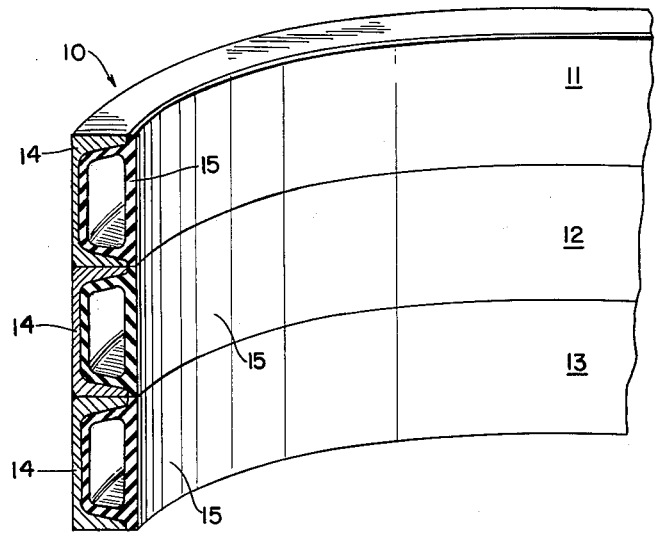

May 31, 1966   T. C. HOLLANDER, JR   3,253,854

UNIVERSAL PNEUMATIC GRIPPING DEVICE

Filed March 16, 1964

INVENTOR
THEODORE C. HOLLANDER, JR.
BY
*Mandeville & Schweitzer*
ATTORNEYS

# United States Patent Office 3,253,854
Patented May 31, 1966

3,253,854
UNIVERSAL PNEUMATIC GRIPPING DEVICE
Theodore C. Hollander, Jr., Sherman, Conn., assignor to The Presray Corporation, Pawling, N.Y., a corporation of New York
Filed Mar. 16, 1964, Ser. No. 352,179
2 Claims. (Cl. 294—99)

The present invention relates to pneumatic gripping devices and is directed more specifically to improvements in pneumatic gripping elements therefor, whereby the gripping devices may better accommodate heavy and/or delicate objects. The device of the present invention is particularly suitable for use in conjunction with pneumatic gripping devices of the type described and claimed in the L. P. Hollander et al. United States Patent No. 2,894,780, although it is contemplated that the gripping device of the present invention may have even more universal application.

In a gripping device of the type contemplated by the invention, there are provided one or more rigid channel members, the open sides of which face toward an object positioned to be gripped. Tubular gripping elements, formed of resilient material, are received in and confined by the channel members and have outer wall surfaces adapted to engage the object. Typically, but not necessarily, the gripping device is of annular form for gripping a cylindrical object either externally or internally. The size and shape of the gripping device is such as to be closely received within or about the object, enabling the tubular gripping element to be expanded by pneumatic pressure into firm but uniform and widely distributed gripping contact with the object. The pneumatically actuated gripping element is confined largely within the recess of the channel member such that, when the device is actuated into gripping relation with an object, the object may be lifted, turned, or otherwise handled by appropriate mechanical manipulation of the channel members.

In accordance with a specific aspect of the present invention, a novel and improved pneumatic gripping device is provided which is adapted particularly for the handling of heavy and delicate objects, particularly cylindrical casings. To this end, the gripping device of the invention is so constructed as to accommodate in a highly advantageous manner the stacking of two or more individual gripping units, to increase the overall gripping capacity of the assembly as required where the object has significant weight and/or where the object is of such delicacy as to require the gripping force to be spread over a large surface area.

In the handling of delicate parts, it is sometimes necessary to avoid any metal-to-metal contact between the object to be handled and the gripping device, a requirement which with conventional equipment may present significant problems in conjunction with the maneuvering of the object or the gripping device into gripping position, while the pneumatic gripping elements are in a deflated condition. In accordance with a specific feature of the present invention, the pneumatic gripping element is so designed and constructed as to provide an initially substantially flat outer wall which extends from one side extremity to the other of its supporting channel member, and provides protective flanges which overlie the end extremities of the channel arms and prevent metal-to-metal engagement between the object to be gripped and the channel. A particularly significant feature of the present invention resides in the design and construction of the individual gripping units in a way to accommodate universal application either in single or multiple unit gripping devices, such that standardized components may be utilized in gripping devices of various overall designs intended for various end use requirements.

Figure 2:
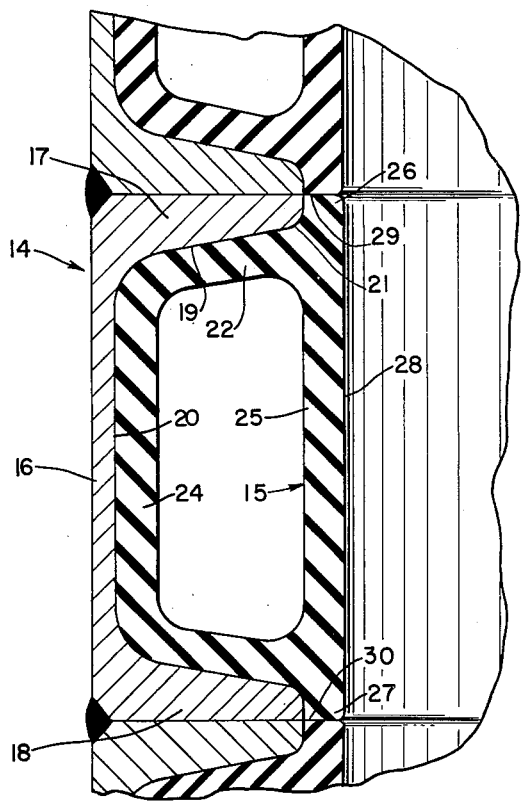

For a better understanding of the invention, reference should be made to the following detailed description and to the accompanying drawing, in which:

FIG. 1 is a fragmentary, perspective view of a three-unit, multiple gripping device incorporating the features of the invention; and FIG. 2 is a greatly enlarged, fragmentary, cross-sectional view similar to FIG. 1, illustrating details of the cross-sectional configuration of the principal components of the new gripping device.

Referring now to the drawing, the reference numeral 10 designates generally a multiple unit gripping device, advantageously of the general type described in the beforementioned Hollander et al. Patent No. 2,894,780. A gripping device according to the Hollander et al. patent comprises a channel member of annular form receiving a tubelike inflatable member formed of resilient material and arranged to be expanded outward of the receiving channel. In its most advantageous form, the device of the Hollander et al. patent is in the form of a solid or segmented circle, arranged to be received within or about a cylindrical wall to be gripped. Although the gripping device may be used advantageously in some cases for simply holding an object stationary, it is more typically and advantageously utilized for lifting and handling of an object, in which case appropriate means, not illustrated herein, are provided to engage and manipulate the rigid channel members. It will be understood, of course, that the equipment of the present invention will be utilized in conjunction with appropriate mounting and/or lifting and handling means and in conjunction with appropriate pneumatic supplies and controls, all of which, by themselves, form no part of the present invention and are therefore omitted from the description in the interest of brevity.

In the specific structure illustrated in FIG. 1, there are provided three separate gripping units identified generally by the reference numerals 11, 12, 13, each consisting of rigid channel members 14 and an inflatable tubelike gripping element 15 formed of resilient material. The channel members 14, which are welded or otherwise secured in assembled relation, may be conventional structural steel channel beams, typically formed to include a flat web portion 16 and spaced channel flanges or arms 17, 18. The outer walls of the channel arms and web section typically are flat and right-angularly related, while the inner walls 19 of the channel arms are outwardly divergent at a small angle, such as 9°. Also, in the open side of the channel, it is typical for the channel surfaces to be generously curved between the interior walls 19 of the channel arms and the interior wall 20 of the web 16 and for the outer extremities of the channel arms 17, 18 to be rounded about their inner corners, as indicated at 21.

In a gripping device according to the invention, the channel members 14 are shaped to conform closely to the surface to be gripped, the most typical shape being circular, as reflected by the illustration of FIG. 1. Where the channels are to be arranged in a closed configuration, either incorporating a solid channel weldment or a segmented hinged channel construction, the operative dimensions of the channel configuration are such as to permit the closed channel to be received within or about the object to be gripped with a substantial clearance, perhaps ½ inch on a side. In the illustrated device, which is an external gripper, the channels 14 would be formed such that the open sides faced inwardly and that their inside diameter, in the case of a circular device, would be appropriately larger than the diameter of the object to be gripped. In an interior gripping device, the channels would be formed so that their open sides faced outward and the outside diameter of the channel, in the case of a circular form, would be appropriately less than the inside diameter of the object to be gripped.

Referring particularly to FIG. 2, the pneumatic gripping element 15 advantageously is of extruded manufacture, being formed of an appropriate resilient material, typically neoprene, natural rubber, or the like. In accordance with the invention, the gripping element has a U-shaped body portion received within the open side of the channel and comprising side walls 22, 23 and a back wall 24. Within the limits of manufacturing tolerances with respect to both the resilient gripping element 15 and the channel 14, the body walls 22–24 of the gripping element are designed to conform closely to the interior configuration of the channel.

As a specific and particularly significant feature of the invention, the outer wall 25, which forms an integral part of the gripping element 15, extends from one side wall to the other of the channel 14 and includes flange extensions 26, 27 which overlie the end extremities of the rigid metal channel arms 17, 18. Advantageously, the outer wall 25 is formed with a normally flat gripping surface 28, which extends from one channel edge to the other, and the end extremities 29, 30 of the outer wall advantageously are squared relative to the outer wall 28 and form, in effect, extensions of the outer surfaces of the channel arms 17, 18.

In a typical pneumatic gripping element according to the invention, utilizing a channel member 14 of about 4 inches in overall width and about 1½ inches in depth, the pneumatic gripping element 15 typically might have walls of about 5/16 inch thickness. Advantageously, the flange extensions 26, 27 likewise may be of about 5/16 inch thickness, such that the entire outer wall structure of the gripping element is of uniform thickness, although it may be appropriate in some cases to vary the thickness of the flange extensions relative to that of the central portions of the outer wall 25.

As illustrated particularly in FIG. 2, the flange extensions 26, 27 overlie and effectively cover the end extremities of the channel arms 17, 18 such that, when the pneumatic element is in a deflated condition, as it is in the illustration of FIG. 2, the gripping unit may be manipulated relative to a delicate object to be gripped without possibility of metal-to-metal contact. Further, and of even greater significance, while the foregoing conditions prevail in connection with a single unit gripping device, the advantages of the invention are realized to a particularly important degree in connection with multiple unit gripping devices, where a plurality of channel members 14, containing pneumatic gripping elements 15 according to the invention, are stacked in side-by-side, substantially contacting relation, as illustrated in the drawing. In the multiple unit griping device, using a pneumatic element of universal design which is also applicable to a single unit device, there is provided an effectively continuous resilient wall surface from one end to the other of the assembled gripping units. The arrangement is such that, in a closed cylindrical gripping device, for example, the gripping device may be applied axially over an object to be gripped for a substantial distance, as may be required in the case of an elongated cylindrical object, without fear of metal-to-metal contact at any time, even though the gripping elements are fully deflated and even though the mass and inertia of the parts being manipulated may be substantial.

A particularly significant feature of the invention resides in the provision of a pneumatic gripping element provided with a flat, outer wall having flange extensions overlying the edge extremities of the channel arms and terminating at the side wall surfaces of the channel. The arrangement is such that a pneumatic element of standardized configuration may be utilized in all types and styles of single and multiple unit gripping devices, without regard to whether a particular unit is to be located at one or the other end of the unit or between the ends. The squared ends of the flanged extensions 26, 27 enable full protection to be realized in a single unit gripping device and, more importantly, provide for an effectively continuous resilient surface in a multiple unit device.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. A pneumatic gripping device, comprising
 (a) a plurality of structural channel members mounted in side-by-side relation and having their open sides facing in the same direction,
 (b) each of said channel members being arranged in a substantially closed geometric pattern, and
 (c) an inflatable tubular gripping element received in the open side of each of said channel members,
 (d) said tubular gripping elements being of extruded form, conforming generally to the interior configuration of the channel members and having generally flat outer walls overlying the arm extremities of the channel members and extending to the outer wall surfaces of the respective channel arms.

2. The gripping device of claim 1, in which
 (a) said channel members are arranged in immediately adjacent, substantially contacting relation, and
 (b) the outer walls of adjacent gripping elements abutting at adjacent side edges to present an effectively continuous gripping surface.

References Cited by the Examiner

UNITED STATES PATENTS 2,775,869   1/1957   Pointer _____ 294—93 X
2,894,780   7/1959   Hollander et al. _____ 294—93

GERALD M. FORLENZA, *Primary Examiner.*

HUGO O. SCHULZ, *Examiner.*

G. F. ABRAHAM, *Assistant Examiner.*